United States Patent [19]
Brandenburg et al.

[11] Patent Number: 6,115,688
[45] Date of Patent: Sep. 5, 2000

[54] PROCESS AND DEVICE FOR THE SCALABLE CODING OF AUDIO SIGNALS

[75] Inventors: Karlheinz Brandenburg; Dieter Seitzer, both of Erlangen; Bernhard Grill, Lauf, all of Germany

[73] Assignee: Fraunhofer-Gesellschaft zur Förderung der angewandten Forschung e.V., München, Germany

[21] Appl. No.: 09/051,347

[22] PCT Filed: Aug. 16, 1996

[86] PCT No.: PCT/EP96/03609

§ 371 Date: Jul. 1, 1998

§ 102(e) Date: Jul. 1, 1998

[87] PCT Pub. No.: WO97/14229

PCT Pub. Date: Apr. 17, 1997

[30] Foreign Application Priority Data

Oct. 6, 1995 [DE] Germany .............. 195 37 338

[51] Int. Cl.[7] ............................................. G10K 21/04
[52] U.S. Cl. ........................................ 704/503; 704/504
[58] Field of Search ................................. 704/500–503, 704/229, 230

[56] References Cited

FOREIGN PATENT DOCUMENTS

WO 95/10890   4/1995   WIPO .................... H04B 1/66

OTHER PUBLICATIONS

Brandenburg et al: "Mikroelektronik in der Audiocodierung" in:me, 1995, Nr. 1, S. 24–27.

Brandenburg, Grill: "First Ideas on Scalable Audio Coding" 97th AES–Convention, San Francisco 1995, Vorabdruck 3924, 1994.

Brandenburg, Grill: "A Two– or Three–Stage Bit Rate Scalable Audio Coding System", Presented at the 99th Convention of AES, New York, Oct. 6–9, 1995.

Shen, A. et al: "A Robust Variable–Rate Speech Coder", 1995 International Conference on Acoustics, Speech, and Signal Processing, Detroit, MI., May 9–12, 1995.

Campbell et al: "Meeting End–to–End QoS Challenges for Scalable Flows in Heterogeneous Multimedia Environments", Technical Report, Center for Telecommunications Research, Nov. 9, 1995.

Kudumakis, Sandler: "Wavelet Packet Based Scalable Ausio Coding", 1996 IEEE International Symposium on Circuits and Systems, Atlanta, Georgia, May 12–15, 1996.

*Primary Examiner*—Krista Zele
*Assistant Examiner*—Michael N. Opsasnick
*Attorney, Agent, or Firm*—Duft, Graziano & Forest, P.C.

[57] ABSTRACT

In coding of an audio signal, coded signals with low quality and bit rate on the one hand and coded signals with high quality and bit rate on the other hand are transmitted to a decoder. At first, the audio signal is coded with low bit rate and is transmitted to the decoder before an additional coded signal is transmitted to the decoder, which either alone or together with the first coded signal upon decoding thereof provides a decoded signal with high quality within the decoder. In this manner, a low-quality decoded signal is generated first in the decoder before decoding of the high-quality signal is possible.

16 Claims, 2 Drawing Sheets

PROCESS AND DEVICE FOR THE SCALABLE CODING OF AUDIO SIGNALS

BACKGROUND OF THE INVENTION

1. Field of the Invention

The present invention relates to a method of and an apparatus for coding an audio signal or a plurality of audio signals, in which coded signals, produced on the basis of the audio signal or audio signals, respectively, by coding, with low quality and low bit rate, and possibly with high quality and high bit rate in addition, are transmitted to a decoder for being decoded by the same optionally with low quality or with high quality.

2. Description of Related Art

Although scalable audio coding systems in the sense of the future standard MPEG-4 are not yet available nowadays, the scalability is an essential requirement for supporting the novel functionalities of the future ISO MPEG-4 standard.

In general, the scalability is understood to be the possibility of decoding a partial set of the bit stream representing the coded audio signal so as to form a usable signal. This property is desired in particular when, for example, a data transmission channel does not make available the required entire bandwidth for transmitting a complete bit stream. Another example is incomplete decoding by a decoder of low complexity. Although continuous, complete scalability would be desirable, various discrete scalability layers are defined in practical application.

Different scalability types thus are a constituent part of the list of requirements for the future novel MPEG-4 audio standard.

First suggestions concerning a bit rate scalable system have been described in Brandenburg, H. and Grill, B., 1994, "First Ideas on Scalable Audio Coding", 9th AES Convention, San Francisco 1995, preprint No. 3924.

In the method elucidated in this technical publication, an audio signal is coded first with full bandwidth by means of an innermost so-called "layer" which is constituted by an audio codec operated with a low sampling rate. A difference signal formed by subtracting the decoded signal of the innermost layer from the initial signal or original signal is then coded in an additional audio coder or by means of two cascaded audio codecs operating on the same principle. The particular coded signals are transmitted to the decoder in a common bit stream.

A major problem of this suggested, but so far not implemented technology can be seen in that, for coding a signal of under 10 kbps, a sampling rate of 8 kHz is necessary in the first stage for obtaining reasonable results. Consequently, the entire system delay may be in the order of magnitude of one second or even more.

SUMMARY OF THE INVENTION

On the basis of this prior art, it is the object of the present invention to develop a coding method of the type set forth at the beginning in such a manner that a reduction of the delay caused by coding is obtained.

According to a first aspect, the invention provides a method of coding at least one audio signal, the method having the steps of: generating a first coded signal by coding the audio signal with a low bit rate and low delay in comparison with the delay occurring in coding the audio signal with high quality, and transmitting the first coded signal to a decoder prior to transmitting at least one additional coded signal to the decoder, which alone or together with the first coded signal provides a decoded signal with the high quality upon decoding.

According to a second aspect, the invention provides a method of coding at least one audio signal, in which coded signals, produced on the basis of the at least one audio signal by coding, with low quality and bit rate, and optionally with high quality and bit rate in addition, are transmitted to a decoder for being decoded by the same, the method having the following method steps: generating a first coded signal by coding the audio signal with a low bit rate and low delay in comparison with the delay occurring in coding the audio signal with high quality, generating a second coded signal by coding the audio signal or at least one additional signal derived from the audio signal, with a high bit rate, with the second coded signal alone or together with the first coded signal providing a decoded signal with the high quality upon decoding, transmitting the first coded signal to a decoder, and in case decoding with high quality is desired, transmitting the second coded signal to the decoder after transmitting the first coded signal to the decoder.

The methods of the invention effect a low-quality, but at the same time low-delay transmission of the audio data in essence with the delay of the first coding operation and, thus, a data connection with a delay that is considerably lower than the delay of the overall system.

The decoder on the receiver side can also produce the high-quality decoded signal with the overall delay necessitated by the system. If low-quality, low-delay decoded signals are sufficient, it suffices to transmit the first coded signal to the receiver.

On the basis of the prior art mentioned, a further object to be met by the present invention consists in developing a coding apparatus of the type indicated at the outset in such a manner that a reduction of the delay caused by coding is obtained.

According to a third aspect, the invention provides a coding apparatus for coding at least one audio signal for generating coded signals with low quality and bit rate and, optionally, with high quality and bit rate in addition, the apparatus having: a first coding means for generating a first coded signal by coding the audio signal with a low bit rate and low delay in comparison with the delay occurring in coding the audio signal with high quality, a first decoder fed with the first coded signal, a first delay circuit having a delay corresponding to that of the first coding means and the first decoder, a summing circuit establishing the difference in time between the output signals of the first decoder and the first delay circuit, a second coding means for generating a second coded signal by coding the audio signal or at least one additional signal derived from the audio signal, with a high bit rate, with the second coded signal alone or together with the first coded signal providing a decoded signal with the high quality upon decoding, a bit stream multiplexer fed with the first coded signal and with the second coded signal, a decision stage which feeds to the second coding means either the audio signal delayed by the first delay circuit or the time difference signal formed by the summing circuit, and a second delay circuit connected downstream of the second coding means for delaying the second coded signal, thereby feeding the second coded signal to the bit stream multiplexer prior to the first coded signal.

According to a third aspect, the invention provides a coding apparatus for coding at least one audio signal for generating coded signals with low quality and bit rate and, optionally, with high quality and bit rate in addition, the apparatus having: a means for transforming the audio signal to the spectral range, a first quantization and coding stage for generating a first quantized signal with comparatively low bit rate, a requantization stage connected downstream of the first quantization and coding stage, a spectral summation means for forming the spectral difference between the output signals of the requantization stage and the means for transforming the audio signal to the spectral range, a second quantization and coding stage for generating, on the basis of the output signal of the spectral summation means, a second signal which in comparison with the first signal is more finely quantized and has a high bit rate in comparison with the bit rate of the first signal, a delay stage connected downstream of the second quantization and coding stage, a bit stream formatter connected downstream of the first quantization and coding stage and the delay stage for transmitting the bit stream of the first quantization and coding stage in the overall bit stream on the output side in time staggered manner prior to the bit stream of the second quantization and coding stage.

BRIEF DESCRIPTION OF THE DRAWINGS

Preferred embodiments of schematic circuits for carrying out preferred embodiments of the method according to the invention will be elucidated in more detail hereinafter with reference to the accompanying drawings in which.

BRIEF DESCRIPTION OF THE PREFERRED EMBODIMENTS

Figure 1:
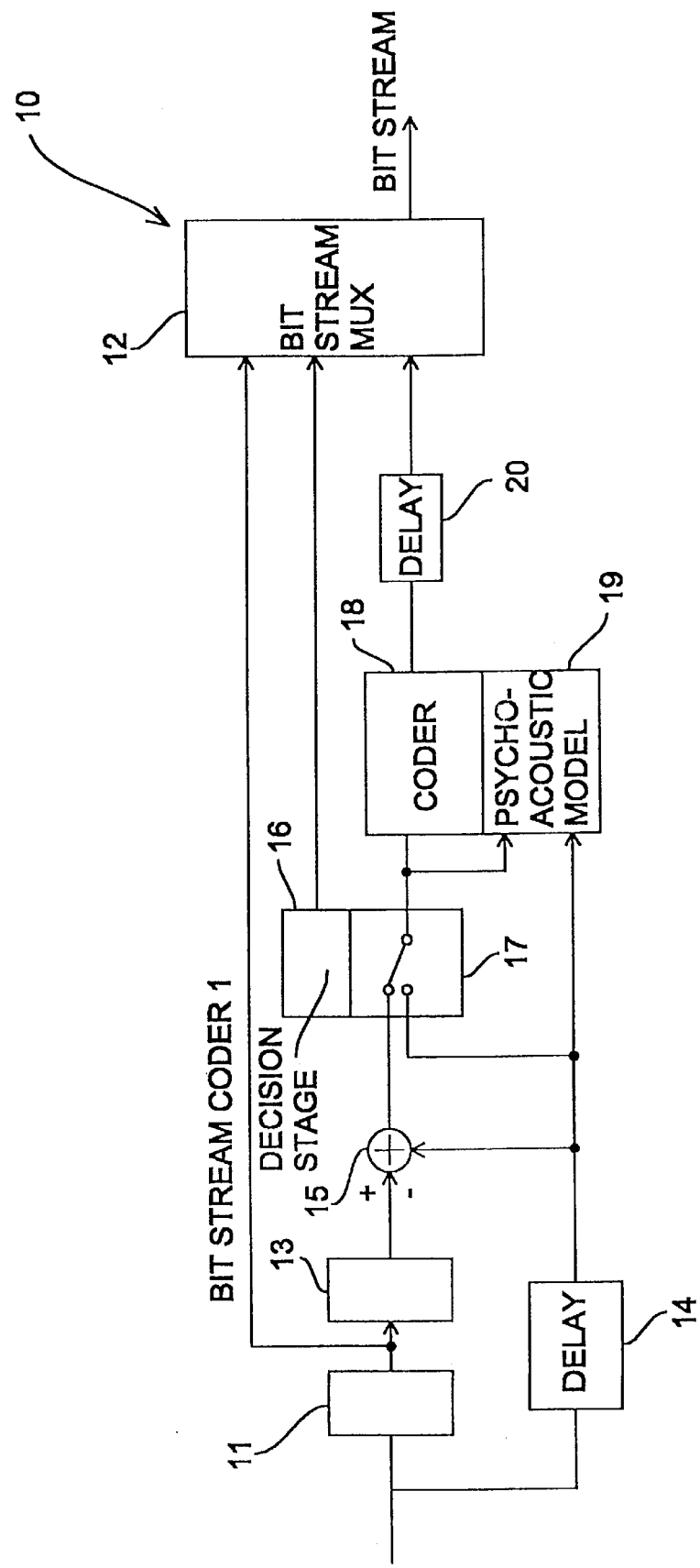
FIG. 1 shows a block diagram of a circuit for performing the method according to the invention, in which the difference in the time range is established.

The circuit shown in FIG. 1, which in its entirety is designated with reference numeral 10, comprises a first coder 11 coding the input side audio signal with comparatively low quality and low bit rate.

The delay caused by such coding, as will still be elucidated in detail, is considerably less than the delay of the overall system for the entire coding operation of the input side audio signal with a high quality and high bit rate. The thus produced first coded signal is supplied on the one hand to an input of a bit stream multiplexer 12 directly and on the other hand to a first decoder 13 constituting a codec stage together with the first coder 11.

The audio signal furthermore is fed to a first delay circuit 14, with the delay thereof corresponding to that of the codec stage 11, 13. At summation point 15, the difference in time between the output signals of the codec stage 11, 13 and the first delay circuit 14 is established.

A decision stage 16 selects either the audio signal delayed by the first delay circuit 14 or the time difference signal formed at summation point 15, by means of a switch 17, for further processing thereof, i.e. for coding by a second coder 18 which thus codes either the time difference signal or the delayed audio signal with high quality and bit rate. During such coding, a psychoacoustic calculation for taking into consideration the masking pattern is performed at least on the basis of the audio signal and possibly on the basis of the difference signal in addition. The second coder 18 to this end comprises a psychoacoustic module 19. The output signal of the second coder 18 is fed via a second delay circuit 20 to a further input of bit stream multiplexer 12.

The bit stream of the first coder 11 is transmitted by the bit stream multiplexer 12 in the output side overall bit stream in time staggered manner before the bit stream of the second coder 18. During transmission of the bits of the first coded signal generated by the first coder 11, coding by the second coder 18 takes place in consideration of the necessary delays, with the bit stream of the second coder being transmitted to the decoder after termination of the transmission of the first coded signal.

The method according to the invention thus renders possible a low-quality, but at the same time low-delay transmission of the audio data in essence with the delay of the first coder 11 and, thus, a data connection with a delay that is considerably lower than the delay of the overall system. With the overall delay necessitated by the system, the decoder on the receiver side can also produce the high-quality decoded signal.

If low-quality, low-delay decoded signals are sufficient, it suffices to transmit the data originating from the first coder to the receiver.

The decision stage 16 supplies to bit stream multiplexer 12 a bit determining whether the difference signal or the delayed audio signal is processed further by the second coder 18. Due to the transmission of this additional information, the decoder on the receiver side is capable of putting together the signal in correct manner. For each time section with a predetermined number of sampling values, preferably one bit is transmitted, indicating whether or not a difference has been determined in the time range.

Figure 2:
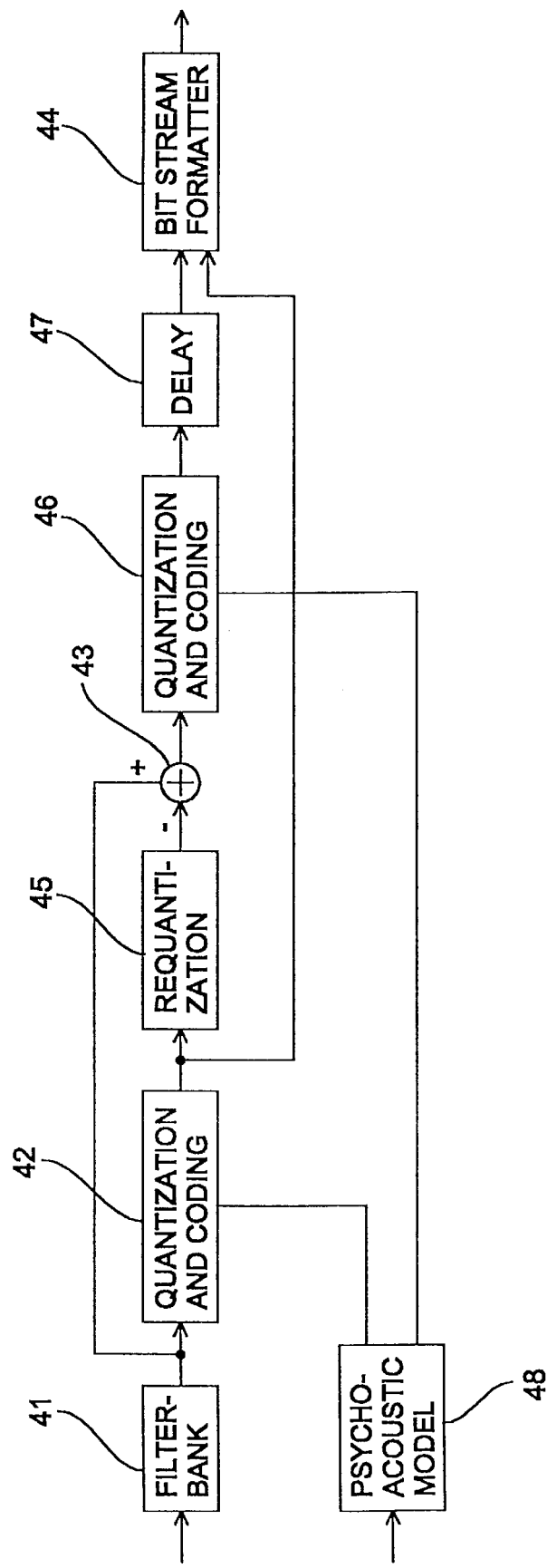
FIG. 2 shows a block diagram of a circuit for performing the method according to the invention, in which the difference in the spectral range is established.

FIG. 2 shows at reference numeral 40 a block diagram of a circuit that equally serves for performing the method according to the invention, in which however the difference is established in the spectral range.

The audio signal is transformed to the spectral range by means of a filter bank 41 and is fed to a first quantization and coding stage 42 on the one hand and to a spectral summation point 43 on the other hand. The output signal of the first quantization and coding stage 42 is supplied to a bit stream formatter 44 on the one hand and to a requantization stage 45 on the other hand, with the output signal of the latter being fed with a negative sign to the spectral summation point 43 for forming a spectral difference.

The difference signal is fed to a second quantization and coding stage 46 the output signal of which is fed to bit stream formatter 44 via a delay stage 47. The bit stream of the first quantization and coding stage 42 is transmitted by the bit stream formatter 44 in the overall bit stream on the output side in time staggered manner prior to the second quantization and coding stage 46.

The audio signal is taken into consideration, via a psychoacoustic model 48, both in the first and in the second quantization and coding stage 42, 46 for taking account of the masking pattern.

The first quantization stage 42 in general processes a more coarsely quantized signal with a comparatively low bit rate, using for example a Huffman Code. This takes place under the control of a second output of the psychoacoustic model 48. This second output provides hints to the effect at which frequencies the noise levels can be increased while maintaining the lowest degree of audibility of the quantization error.

Subsequent to this stage 42, a more finely quantized signal is generated in stage 46, introducing therein scaling factors and an additional code word, such as e.g. a PCM code word. This conception can be extended to further lower-value bits in a layer with still higher quality.

What is claimed is:

1. A method of coding at least one audio signal, comprising the following method steps:

generating a first coded signal by coding said audio signal with a low bit rate and low delay in comparison with the delay occurring in coding said audio signal with high quality;

generating a second coded signal by coding said audio signal or at least one additional signal derived from said audio signal, with a high bit rate, with said second coded signal along or together with said first coded signal providing a decoded signal with said high quality upon decoding; and transmitting said first coded signal to a decoder prior to transmitting said second coded signal to the decoder.

2. The method of claim 1, wherein said step of generating said second coded signal comprises the following steps:

decoding said first coded signal;

delaying said audio signal by a delay that corresponds to the delay occurring by coding said first coded signal and by decoding thereof so as to form a delayed signal;

subtracting the decoded first signal and the delayed signal so as to form a difference signal; and coding said difference signal with a high quality and a high bit rate so as to form said second coded signal.

3. The method of claim 2, wherein said first coded signal is transmitted in a bit stream within a bit stream frame situated before the bit stream frame within which said second coded signal is transmitted.

4. The method of claim 2, wherein, within a time section having a given number of sampling values, a particular item of information is transmitted each, indicating whether said second coded signal transmitted with high quality and bit rate has been created by coding said at least one audio signal with a high bit rate or by coding said difference signal.

5. The method of claim 2, wherein coding of said difference signal involves a psychoacoustic calculation for taking account of the masking threshold, with said psychoacoustic calculation being performed on the basis of the at least one audio signal or on the basis of the at least one audio signal and in addition thereto on the basis of the difference signal.

6. The method of claim 1, wherein said step of generating said second coded signal comprises:

coding said audio signal with a high quality and a high bit rate so as to form said second coded signal.

7. The method of claim 6, wherein the first coded signal is transmitted in a bit stream within a bit stream frame situated before the bit stream frame within which said second coded signal is transmitted.

8. A method of coding at least one audio signal, in which coded signals, produced on the basis of said at least one audio signal by coding, with low quality and bit rate, and optionally with high quality and bit rate in addition, are transmitted to a decoder for being decoded by the same, said method comprising the following method steps:

generating a first coded signal by coding said audio signal with a low bit rate and low delay in comparison with the delay occurring in coding said audio signal with high quality;

generating a second coded signal by coding said audio signal or at least one additional signal derived from the audio signal, with a high bit rate, with the second coded signal alone or together with said first coded signal providing a decoded signal with said high quality upon decoding;

transmitting said first coded signal to a decoder; and in case decoding with high quality is desired, transmitting said second coded signal to the decoder after transmitting said first coded signal to the decoder.

9. The method of claim 8, wherein the step of generating the second coded signal comprises the following steps:

decoding said first coded signal;

delaying said audio signal by a delay that corresponds to the delay occurring by coding said first coded signal and by decoding thereof so as to form a delayed signal;

subtracting said decoded first signal and said delayed signal so as to form a difference signal; and coding said difference signal with a high quality and a high bit rate so as to form said second coded signal.

10. The method of claim 9, wherein said first coded signal is transmitted in a bit stream within a bit stream frame situated before the bit stream frame within which said second coded signal is transmitted.

11. The method of claim 9, wherein, within a time section having a given number of sampling values, a particular item of information is transmitted each, indicating whether said second coded signal transmitted with high quality and bit rate has been created by coding said at least one audio signal or by coding said difference signal.

12. The method of claim 9, wherein coding of said difference signal of said decoded first signal and said delayed signal involves a psychoacoustic calculation for taking account of the masking threshold, with said psychoacoustic calculation being performed on the basis of said at least one audio signal or on the basis of said at least one audio signal and in addition thereto on the basis of said difference signal.

13. The method of claim 8, wherein said step of generating said second coded signal comprises the following step:

coding the audio signal with a high quality and a high bit rate so as to form said second coded signal.

14. The method of claim 13, wherein said first coded signal is transmitted in a bit stream within a bit stream frame situated before the bit stream frame within which said second code signal with high quality is transmitted.

15. A coding apparatus for coding at least one audio signal for generating coded signals with low quality and bit rate and, optionally, with high quality and bit rate in addition, said apparatus comprising:

a first coding means for generating a first coded signal by coding the audio signal with a low bit rate and low delay in comparison with the delay occurring in coding the audio signal with high quality;

a first decoder fed with the first coded signal;

a first delay circuit having a delay corresponding to that of the first coding means and the first decoder;

a summing circuit establishing the difference in time between the output signals of the first decoder and the first delay circuit;

a second coding means for generating a second coded signal by coding the audio signal or at least one additional signal derived from the audio signal, with a high bit rate, with the second coded signal alone or together with the first coded signal providing a decoded signal with said high quality upon decoding;

a bit stream multiplexer fed with the first coded signal and with the second coded signal;

a decision stage which feeds to the second coding means either the audio signal delayed by the first delay circuit or the time difference signal formed by the summing circuit; and a second delay circuit connected downstream of the second coding means for delaying the second coded signal, thereby feeding the first coded signal to the bit stream multiplexer prior to the second coded signal.

16. A coding apparatus for coding at least one audio signal for generating coded signals with low quality and bit rate and, optionally, with high quality and bit rate in addition, said apparatus comprising:

- a means for transforming the audio signal to the spectral domain;
- a first quantization stage for generating a first quantized signal with comparatively low bit rate;
- a requantization and coding stage connected downstream of the first quantization and coding stage;
- a spectral summation means for forming the spectral difference between the output signals of the requantization stage and the means for transforming the audio signal to the spectral domain;
- a second quantization and coding stage for generating, on the basis of the output signal of the spectral summation means, a second signal which in comparison is more finely quantized and has a high bit rate in comparison with the bit rate of the first signal;
- a delay stage connected downstream of the second quantization and coding stage;
- a bit stream formatter connected downstream of the first quantization and coding stage and the delay stage for transmitting the bit stream of the first quantization and coding stage in the overall bit stream on the output side in time staggered manner prior to the bit stream of the second quantization and coding stage.

* * * * *